US012551151B2

(12) United States Patent
Cho et al.

(10) Patent No.: US 12,551,151 B2
(45) Date of Patent: Feb. 17, 2026

(54) METHOD, DEVICE AND SYSTEM FOR REHABILITATING COGNITIVE FUNCTION BY USING VIRTUAL OBJECT MODEL

(71) Applicant: DELVINE INC., Seoul (KR)

(72) Inventors: Sung Min Cho, Seoul (KR); Won Seok Kim, Seoul (KR); Jung Taek Park, Seoul (KR); Young Hoo Cho, Seoul (KR)

(73) Assignee: DELVINE INC., Seoul (KR)

( * ) Notice: Subject to any disclaimer, the term of this patent is extended or adjusted under 35 U.S.C. 154(b) by 370 days.

(21) Appl. No.: 18/255,171

(22) PCT Filed: Nov. 5, 2021

(86) PCT No.: PCT/KR2021/016028
§ 371 (c)(1),
(2) Date: May 31, 2023

(87) PCT Pub. No.: WO2022/145690
PCT Pub. Date: Jul. 7, 2022

(65) Prior Publication Data
US 2024/0090805 A1     Mar. 21, 2024

(30) Foreign Application Priority Data
Dec. 31, 2020   (KR) .......................  10-2020-0189676

(51) Int. Cl.
*A61B 5/16*   (2006.01)
*A61M 21/00*   (2006.01)
(Continued)

(52) U.S. Cl.
CPC ............. *A61B 5/162* (2013.01); *A61M 21/00* (2013.01); *G16H 20/30* (2018.01); *G16H 50/20* (2018.01);
(Continued)

(58) Field of Classification Search
USPC .................................. 600/300–301; 434/236
See application file for complete search history.

(56) References Cited

U.S. PATENT DOCUMENTS

| 2010/0016730 A1* | 1/2010 | Tanaka | A61B 3/024 |
| | | | 600/476 |
| 2012/0077160 A1* | 3/2012 | DeGutis | G09B 7/02 |
| | | | 434/236 |

(Continued)

FOREIGN PATENT DOCUMENTS

| JP | 2013-535717 A | 9/2013 |
| KR | 10-2015-0052078 A | 5/2015 |

(Continued)

OTHER PUBLICATIONS

"Tsirlin, et al., Uses of Virtual Reality for Diagnosis, Rehabilitation and Study of Unilateral Spatial Neglect: Review and Analysis, CyberPsychology and Behavior, vol. 12, No. 2, 2009, pp. 175-181" (Year: 2009).*

(Continued)

Primary Examiner — Michael T. Holtzclaw
(74) Attorney, Agent, or Firm — Studebaker Brackett PLLC

(57) ABSTRACT

The present disclosure relates to a method by which a device provides a service so as to enable cognitive function rehabilitation by using a virtual object model. The method includes the steps of: generating first preliminary stimuli for identifying egocentric neglect in a visual range of a subject; obtaining first reaction information about the first preliminary stimuli; determining an egocentric cognition range in which the subject can egocentrically recognize visual stimuli; sequentially generating second preliminary stimuli for identifying allocentric neglect in the egocentric cognition range; obtaining second reaction information about the second preliminary stimuli; determining an allocentric cog- (Continued)

nition range in which the subject can allocentrically recognize visual stimuli; generating input stimuli for the subject in consideration of the egocentric cognition range and the allocentric cognition range; and obtaining third reaction information, according to a predetermined reaction operation of the subject, for the input stimuli.

6 Claims, 9 Drawing Sheets

(51) Int. Cl.
  *G16H 20/30* (2018.01)
  *G16H 50/20* (2018.01)
  *G16H 50/50* (2018.01)
(52) U.S. Cl.
  CPC ..... *G16H 50/50* (2018.01); *A61M 2021/0044* (2013.01); *A61M 2205/507* (2013.01)

(56) References Cited

U.S. PATENT DOCUMENTS

| | | | | |
|---|---|---|---|---|
| 2012/0164618 | A1* | 6/2012 | Kullok | A61B 5/7285 434/323 |
| 2017/0365101 | A1* | 12/2017 | Samec | G16H 20/70 |
| 2018/0336973 | A1* | 11/2018 | Tadi | G06T 19/003 |
| 2020/0253527 | A1* | 8/2020 | Ellison | A61B 5/165 |
| 2022/0175242 | A1* | 6/2022 | Iwata | A61B 5/4088 |

FOREIGN PATENT DOCUMENTS

| | | |
|---|---|---|
| KR | 10-2015-0132681 A | 11/2015 |
| KR | 10-2017-0111282 A | 10/2017 |
| KR | 10-2018-0078619 A | 7/2018 |
| KR | 10-1907181 B1 | 10/2018 |
| KR | 10-2234995 B1 | 4/2021 |
| WO | WO-2022122834 A1 * 6/2022 ............ A61B 5/162 |

OTHER PUBLICATIONS

"Morganti, et al., A context-based interactive evaluation of neglect syndrome in virtual reality, 2007, IEEE, pp. 169-173" (Year: 2007 ).*

"Pedroli, et al., Assessment and rehabilitation of neglect using virtual reality: a systemic review, 2015, frontiers in Behavioral Neuroscience, vol. 9, Article 226, pp. 1-15" (Year: 2015).*

* cited by examiner

METHOD, DEVICE AND SYSTEM FOR REHABILITATING COGNITIVE FUNCTION BY USING VIRTUAL OBJECT MODEL

TECHNICAL FIELD

Embodiments set forth herein relate to a technique for providing cognitive function rehabilitation using a virtual object model.

BACKGROUND ART

Hemi-visuo-spatial neglect is a symptom of failing to recognize the space-time opposite to a damaged brain hemisphere, is common after brain damage, and is one of the major symptoms that seriously inhibit the recovery of functions. Such hemineglect symptoms may be classified into egocentric neglect in which a cognitive range is biased to one side in the field of vision and allocentric neglect in which there is a cognitive range for only one side of each visual stimulus.

Patients who suffer from such a hemineglect symptom do not consistently use the body on the hemiplegic side and thus experience great inconvenience in daily activities even when the motor skill on the hemiplegic side returns to normal.

Therefore, various evaluation and rehabilitation methods have been studied to address problems related to hemineglect in terms of vision and motor skills. However, in conventional visual stimulus generation methods for evaluation and rehabilitation of hemineglect, a hemineglect symptom is evaluated through a physical stimulus and reaction in a real space and thus an experienced evaluator with long experience is required for exact evaluation, but sufficient reliability is difficult to secure even when an experienced evaluator is used.

In addition, in the conventional visual stimulus generation methods, it is difficult to quantify evaluation results, because a field of vision, performance conditions, and a state may vary according to a patient. Thus, even when an evaluation is conducted, it is difficult to guarantee the practical effectiveness of an evaluation result, and furthermore, it is difficult to perform a rehabilitation process to alleviate a patient's symptom on the basis of the evaluation result.

Therefore, there is a need for a visual stimulus generation system and method for quantifying the degree of a patient's symptom and reflecting the patient's reaction during an evaluation for substantially effective diagnosis and rehabilitation. Korean Patent Registration No. 10-1907181 discloses a visual stimulus generation method and system for generating a visual stimulus in the field of vision of a subject using a virtual model in a virtual space and identifying a visual cognitive range of the subject, and a computer-readable recording medium therefor.

In Korean Patent Registration No. 10-1907181, a visual stimulus is generated in the field of vision of a subject for rehabilitation of hemineglect without distinguishing between egocentric neglect and allocentric neglect.

Therefore, there is a limit to individually providing rehabilitation training specialized for patients with an egocentric neglect symptom and rehabilitation training specialized for patients with an allocentric neglect symptom.

DISCLOSURE

Technical Problem

An embodiment provides a cognitive function rehabilitation method, device, and system using a virtual object model, in which a plurality of first preliminary stimuli are sequentially generated to identify egocentric neglect in the field of vision of a subject on the basis of a virtual object model, and a plurality of second preliminary stimuli are sequentially generated to identify allocentric neglect in an egocentric cognitive range based on the virtual object model.

Aspects of the present disclosure are not limited thereto and other aspects that are not mentioned herein will be clearly understood from the following description.

Technical Solution

An aspect of the present disclosure provides a method of providing, by a device, a service for cognitive function rehabilitation using a virtual object model, the method including generating a virtual object model in a virtual space matched to a real space in which a subject is located, sequentially generating a plurality of first preliminary stimuli for identifying egocentric neglect in a field of vision of the subject, based on the virtual object model, obtaining and collecting first reaction information indicating whether the first preliminary stimuli are recognized by the subject, determining an egocentric cognitive range in which the subject is able to egocentrically recognize a visual stimulus, based on the first reaction information, sequentially generating a plurality of second preliminary stimuli for identifying allocentric neglect in an egocentric cognitive range, based on the virtual object model, obtaining and collecting second reaction information indicating whether the second preliminary stimuli are recognized by the subject; and determining an allocentric cognitive range in which the subject is able to allocentrically recognize a visual stimulus, based on the second reaction information.

The method may further include generating an input stimulus for the subject by taking into account the egocentric cognitive range and the allocentric cognitive range, and obtaining and collecting third reaction information according to a predetermined reaction of the subject to the input stimulus.

The generating of the virtual object model may include matching the real space and the virtual space to correspond to each other so as to locate a first object and a second object, which are respectively located on a first side and a second side of the real space, in the virtual space, the determining of the egocentric cognitive range may include determining that there is egocentric neglect when it is determined that either a first preliminary stimulus displayed in an area of the first object or a first preliminary stimulus displayed in an area of the second object is not recognized, and the determining of the allocentric cognitive range may include determining that there is allocentric neglect when it is determined that either a second preliminary stimulus displayed on a first side region of the area of the first object or a second preliminary stimulus displayed on a second side region of the area of the second object is not recognized.

The sequentially generating of the plurality of first preliminary stimuli may include generating a 1-1 preliminary stimulus to be displayed at a first point at an end of a first side of the field of vision of the subject, generating a 1-2 preliminary stimulus to be displayed at a second point at an end of a second side of the field of vision of the subject, generating a 1-3 preliminary stimulus to be displayed at a third point, which is a midpoint between the first and second points, when the 1-1 preliminary stimulus among the 1-1 preliminary stimulus and the 1-2 preliminary stimulus is not recognized, generating a 1-4 preliminary stimulus to be displayed at a fourth point, which is a midpoint between the first and third points, when the 1-3 preliminary stimulus is recognized; and generating a 1-5 preliminary stimulus to be displayed at a fifth point, which is a midpoint between the second and third points, when the 1-3 preliminary stimulus is not recognized. The determining of the egocentric cognitive range may include determining a space between the second and fourth points to be an egocentric cognitive range when it is determined that the 1-4 preliminary stimulus is recognized, determining a space between the second and third points to be an egocentric cognitive range when it is determined that the 1-4 preliminary stimulus is not recognized, and determining a space between the second and fifth points to be an egocentric cognitive range when it is determined that the 1-5 preliminary stimulus is recognized.

The method may further include setting a cognitive training area adjacent to a boundary of the egocentric cognitive range or a boundary of the allocentric cognitive range and determining a generation rate of the input stimulus to be displayed in the cognitive training area, based on a learning curve according to the third reaction information, and obtaining and collecting the third reaction information again according to the subject's reaction to the input stimulus generated intensively in the cognitive training area, based on the generation rate. The first reaction information may include information indicating a reaction rate, accuracy, and shaking with respect to the first preliminary stimuli, the second reaction information may include information indicating a reaction rate, accuracy, and shaking with respect to the second preliminary stimuli, and the third reaction information may include information indicating a reaction rate, accuracy, and shaking with respect to the input stimulus.

The sequentially generating of the plurality of second preliminary stimuli may include generating a 2-1 preliminary stimulus to be displayed at a sixth point on a second side of an area of a first object, which is located on a first side of the egocentric cognitive range, generating a 2-2 preliminary stimulus to be displayed at a seventh point on a first side of the area of the first object when the 2-1 preliminary stimulus is recognized, generating a 2-3 preliminary stimulus to be displayed at an eight point on a second side of an area of a second object, which is located on a second side of the egocentric cognitive range, when the 2-2 preliminary stimulus is recognized, and generating a 2-4 preliminary stimulus to be displayed at a ninth point on a first side of the area of the second object when the 2-2 preliminary stimulus is not recognized. The determining of the allocentric cognitive range may include determining that the subject does not suffer from allocentric neglect when it is determined that the 2-3 preliminary stimulus is recognized, and determining that the subject suffers from allocentric neglect when it is determined that the 2-4 preliminary stimulus is not recognized.

The method may further include: displaying the virtual space, and checking a target temperature and a target humidity that are set for each of a plurality of head-mounted display (HMD) devices disposed in a rehabilitation training room to provide a virtual reality; controlling operations of a plurality of thermo-hygrostats connected to the plurality of HMD devices to adjust a temperature measured in each of the plurality of HMD devices to the target temperature and a humidity measured in each of the plurality of HMD devices to the target humidity; checking the number of adjustments adjusted to maintain the target temperature and the target humidity for a predetermined duration for each of the plurality of HMD devices; classifying, as a normal state, a first HDM device whose number of adjustments is identified to be within a reference range, and classifying, as an abnormal state, a second HDM device whose number of adjustments is identified to be out of a reference range; controlling a message notifying the abnormal state of the second HMD device to be transmitted to a manager terminal when the second HMD device is classified as the abnormal state; classifying the second HDM device from the abnormal state to an idle state when it is determined that the number of adjustments of the second HMD device is less than a minimum value of the reference range, and classifying the second HMD device from the abnormal state to an overload stage when it is determined that the number of adjustments of the second HDM device is greater than a maximum value of the reference range; controlling a message notifying the idle state of the second HDM device to be transmitted to the manager terminal when the second HDM device is classified as the idle state, and controlling a message notifying the overload state of the second HDM device to be transmitted to the manager terminal when the second HDM device is classified as the overload state; classifying the second HDM device as a device whose position is to be changed when it is determined that the idle state of the second HDM device lasts for a predetermined reference time or longer, and classifying the second HDM device as a device to be repaired when it is determined that the overload state of the second HDM device lasts for the predetermined reference time or longer; and controlling a message, which notifies that the position of the second HDM device is to be changed, to be transmitted to the manager terminal when the second HDM device is classified as a device whose position is to be changed, and controlling a message, which notifies that the second HDM device needs to be repaired, to be transmitted to the manager terminal when the second HDM device is classified as a device to be repaired.

Another aspect of the present disclosure, a device for providing a service for cognitive function rehabilitation using a virtual object model includes a virtual model generation module configured to generate a virtual object model in a virtual space, a virtual space matching module configured to match a real space in which a subject is located and the virtual space to correspond to each other, a visual stimulus generation module configured to sequentially generate a plurality of first preliminary stimuli for identifying egocentric neglect in a field of vision of the subject based on the virtual object model, a reaction collection module configured to obtain and collect first reaction information indicating whether the first preliminary stimuli are recognized by the subject, and a reaction analysis module configured to determine an egocentric cognitive range in which the subject is able to egocentrically recognize a visual stimulus, based on the first reaction information. The visual stimulus generation module sequentially generates a plurality of second preliminary stimuli for identifying allocentric neglect in the egocentric cognitive range, based on the virtual object model, the reaction collection module obtains and collects second reaction information indicating whether the second preliminary stimuli are recognized by the subject, and the reaction analysis module determines an allocentric cognitive range in which the subject is able to allocentrically recognize a visual stimulus, based on the second reaction information.

Advantageous Effects

According to an embodiment, it is possible to individually provide rehabilitation training specialized for patents with an egocentric neglect symptom and rehabilitation training specialized for patients with an allocentric neglect symptom by sequentially generating a plurality of first preliminary stimuli for identifying egocentric neglect in the field of vision of a subject based on a virtual object model, and sequentially generating a plurality of second preliminary stimuli for identifying allocentric neglect in an egocentric cognitive range based on the virtual object model.

Effects of the present disclosure are not limited thereto, and other effects that are not described herein will be clearly understood by those of ordinary skill in the art to which the present disclosure pertains from the following description.

MODES OF THE INVENTION

Figure 1:
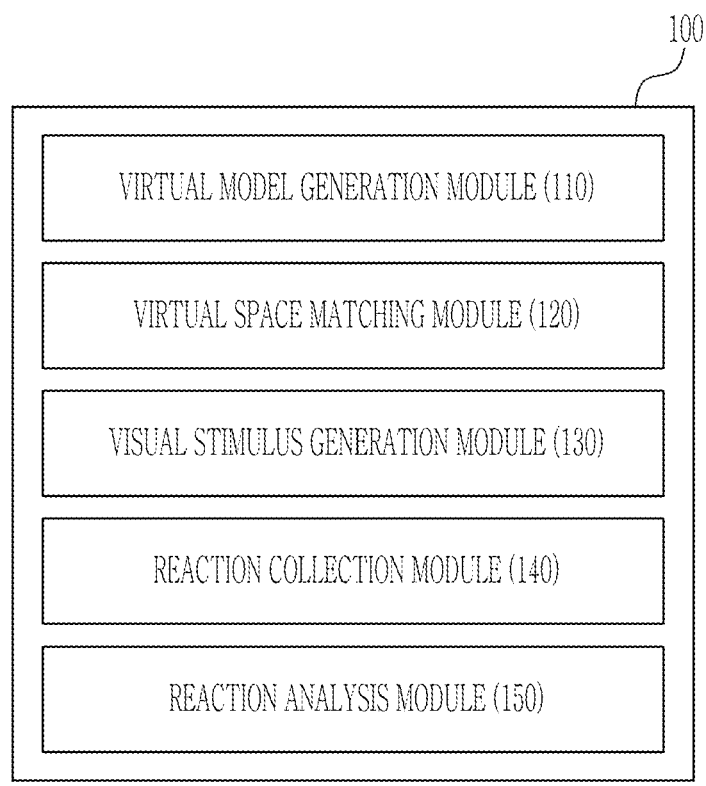
FIG. 1 is a schematic diagram of a configuration of a device according to an embodiment.

Hereinafter, embodiments will be described in detail with reference to the accompanying drawings. However, various changes may be made in the embodiments and thus the scope of the patent application is not limited by or to the embodiments. It should be understood that all changes, equivalents, or alternatives for the embodiments are included in the scope of the present disclosure.

Specific structures or functions according to the embodiments are provided only for illustrative purposes and thus the embodiments may be embodied in many different forms. Therefore, it should be understood that the embodiments are not limited to specific forms and the scope of the present disclosure includes changes, equivalents, or alternatives included in the technical idea thereof.

The terms "first," "second," etc. may be used to describe various elements but are only used herein to distinguish one element from another element. For example, a "first component" may be named "second component." and similarly, a "second component" may be named "first component."

It should be understood that when a component is referred to as being "coupled to" another component, the component may be directly coupled to or connected to the other component but another component may be interposed therebetween.

The terms used in the embodiments are used only for description and should not be interpreted as limiting the scope of the embodiments. As used herein, the singular expressions are intended to include plural forms as well, unless the context clearly dictates otherwise. It should be understood that the terms "comprise" and/or "comprising," when used herein, specify the presence of stated features, integers, steps, operations, elements, components, or a combination thereof, but do not preclude the presence or addition of one or more features, integers, steps, operations, elements, components, or a combination thereof.

Unless defined otherwise, all terms used herein, including technical or scientific terms, have the same meaning as commonly understood by those of ordinary skill in the art to which the embodiments pertain. Terms such as those defined in a commonly used dictionary should be interpreted as having meanings consistent with meanings in the context of the related art and should not be interpreted as ideal or excessively formal meanings unless explicitly defined herein.

When the attached drawings are described herein, the same components are assigned the same reference numerals regardless of drawing numbers and are not redundantly described. In the following description of the embodiments, the related art is not described in detail when it is determined that it would obscure the embodiments due to unnecessary detail.

The embodiments may be implemented with various types of products such as personal computers, laptop computers, tablet computers, smart phones, televisions, smart home appliances, intelligent cars, kiosks, and wearable devices.

FIG. 1 is a schematic diagram of a configuration of a device according to an embodiment.

According to an embodiment, a device 100 is a device that performs a method of providing a service for rehabilitating a cognitive function using a virtual object model, and may be implemented, for example, as a hardware module, a software module, or a combination thereof.

According to an embodiment, the device 100 may be implemented as a terminal or server. The server may communicate with the terminal, read necessary information from a database to employ the information for judgment, and update the database on the basis of a judgment result. An operation performed by a device may be implemented by either the server or the terminal but may be implemented by an interaction between the server and the terminal. The server and the terminal may include an electronic device.

According to an embodiment, the electronic device may be a smart home appliance with a communication function. The smart home appliance, e.g., the electronic device, may include at least one of a television (TV), a digital video disk (DVD) player, an audio device, a refrigerator, an air conditioner, a cleaner, an oven, a microwave, a washing machine, an air purifier, a set-top box, a TV box (e.g., Samsung HomeSync™, Apple TV™, or Google TV™), a game console, an electronic dictionary, an electronic key, a camcorder, or an electronic picture frame.

According to an embodiment, the electronic device may include at least one of various types of medical devices (e.g., a magnetic resonance angiography (MRA) device, a magnetic resonance imaging (MRI) device, a computed tomography (CT) device, a movie camera, an ultrasonic device, etc.), a navigation device, a global positioning system (GPS)

receiver, an event data recorder (EDR), a flight data recorder (FDR), a vehicle infotainment device, a ship electronic device (e.g., a ship navigation device, a gyrocompass, etc.), avionics, security devices, a vehicle head unit, an industrial or home robot, an automatic teller machine (ATM) of a financial institute or a point of sales (POS) of a store.

According to an embodiment, the electronic device may include at least one of furniture or part of a building/ structure that includes a communication function, an electronic board, an electronic signature receiving device, a projector, or various types of measurement devices (e.g., water, electricity, gas, or radio wave measurement equipment). An electronic device according to an embodiment may be a combination of one or more of the various devices described above. An electronic device according to an embodiment may be a flexible device. It will be obvious to those of ordinary skill in the art that an electronic device according to an embodiment is not limited to the above-described devices. In various embodiments, the term "user" may refer to a human or device (e.g., an artificial intelligence electronic device) capable of using an electronic device.

An electronic device according to an embodiment may include a processor, a memory, a user interface, and a communication interface and may be connected to other electronic devices through a network. The communication interface may transmit and receive data to and from other electronic devices within a predetermined distance through a wired or wireless network, wired serial communication, or the like. The network allows wired or wireless communication to be established between an electronic device according to an embodiment and various types of entities. The electronic device may communicate with various types of entities through the network, and the network may employ standard communication technologies and/or protocols. In this case, it will be apparent to those of ordinary skill in the field of communication technology that the network includes the Internet, a local area network (LAN), a wireless local area network (LAN), a wide area network (WAN), a personal area network (PAN), etc., but is not limited thereto and may be another type of network capable of transmitting and receiving information.

A portable terminal according to an embodiment may be an electronic device with a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted device (HMD) such as electronic glasses), electronic clothing, an electronic bracelet, an electronic necklace, an electronic appcessory, an electronic tattoo, a smart car, or a smart watch.

Referring to FIG. 1, the device 100 includes a virtual model generation module 110, a virtual space matching module 120, a visual stimulus generation module 130, a reaction collection module 140, and a reaction analysis module 150.

The virtual model generation module 110 generates a virtual model in a virtual space. The virtual model may be generated by separate modeling by a provider or generated based on information collected from a separate input device that is an external device, e.g., the reaction collection module 140 in the present embodiment, capable of detecting objects and movements of the objects in a real space. The virtual model generation module 110 may freely generate a virtual model in a virtual space through various well-known methods.

The virtual space is a space in which a virtual model may be generated, moved, or modified. The virtual space may include information about each location thereon based on a certain coordinate system. For example, the virtual space may be a two-dimensional (2D) or three-dimensional (3D) space.

The virtual model may be a virtual object model with an arbitrary shape suitable for visual stimulus or a virtual body model that models a subject's body in the virtual space. An appropriate virtual model may be generated in consideration of the type of visual stimulus to be provided to the subject, a state of the subject, and the like. The virtual model generation module 110 may receive information about the shape and position of the subject's body collected by the reaction collection module 140 and may generate a virtual body model in the virtual space on the basis of the information.

In addition, the virtual model generation module 110 may modify or move the virtual body model according to a change or movement of the subject's body. The virtual body model to be moved or modified may be disposed in a virtual space corresponding to the position of the subject's body but may be intentionally disposed in a virtual space spaced a predetermined distance from a position corresponding to the position of the subject's body.

The virtual space matching module 120 matches a real space in which the subject is located and the virtual space to correspond to each other. The virtual space matching module 120 may match the real space included in the field of vision of the subject and the virtual space displayed in the field of vision of the subject to correspond to each other, based on the subject's position, especially, the subject's eyes, as a reference position.

Accordingly, the subject may recognize a visual stimulus generated through the virtual model in the virtual space as an object in the real space. In addition, the subject may feel as if he or she is located in the virtual space. Through matching performed by the virtual space matching module 120, it is possible to estimate a range in which a user is able to recognize visual stimuli according to a range of virtual object models on which visual stimuli recognized by the user are based.

The matching between the virtual space and the real space may be performed in real time by a well-known matching method using an RGBD camera. By locating the subject at a predetermined position and generating a visual stimulus at a predetermined position, the virtual space and the real space may be matched to each other by calculating a coordinate conversion relationship therebetween in consideration of the position at which the visual stimulus is generated and the position and orientation of the subject.

The visual stimulus generation module 130 generates a visual stimulus in the field of vision of the subject through which the subject is able to perceive a visual stimulus with the subject's eyes on the basis of a virtual model generated by the virtual model generation module 110.

The visual stimulus generation module 130 may generate visual stimuli by displaying a virtual model to the subject, so that a form of the virtual model may have an appropriate size, perspective, etc. according to the subject's viewing angle, position, etc., in consideration of a positional relationship between the virtual space and the real space.

The visual stimuli may be generated at various locations in a space in an up-down direction, a left-right direction, or a front-rear direction with respect to the subject's position. For example, visual stimuli may be generated in a wider range in the up-down direction or the front-rear direction with respect to a subject with a relatively wide viewing angle. Alternatively, visual stimuli may be generated at a closer or more distant location according to the subject's eyesight. As described above, visual stimuli may be generated at various positions in consideration of the subject's state, stimulus conditions, the types of stimuli, and the like.

The visual stimulus generation module 130 may be a virtual reality device for visualizing a virtual space and displaying a resultant image. The visual stimulus generation module 130 may be a display device such as a head-mounted display (HMD) device. A well-known device capable of allowing the sense of direction, the sense of distance, etc. to be felt may be freely used as the visual stimulus generation module 130.

The visual stimulus generation module 130 generates preliminary stimuli to be provided in advance to determine a cognitive range of the field of vision of the subject, which is a range in which the subject is able to perceive visual stimuli, and generate an input stimulus to induce a predetermined reaction of the subject.

The visual stimulus generation module 130 sequentially generates a plurality of preliminary stimuli at a plurality of positions within the field of vision of the subject based on the virtual object model. The number and width of preliminary stimuli, temporal intervals between the stimuli, spatial intervals between the stimuli, etc. that are required to determine the cognitive range may be arbitrarily set, but it is preferable that whether the subject has reacted to previous preliminary stimuli is considered and the intervals are decreased in a narrow range as stimuli continue, so that the subject's state may be considered. For example, as preliminary stimuli are generated sequentially and the subject reacts to a stimulus, preliminary stimuli may be intensively generated near a boundary of an expected cognitive range to determine a cognitive range accurately. Such preliminary stimuli will be described in detail below.

The visual stimulus generation module 130 generates an input stimulus for the subject while taking into account the cognitive range of the subject. Such an input stimulus may be provided in various ways to a subject whose field of vision and cognitive range do not match to check a change in the cognitive range of the subject or cause physical activity in the cognitive range.

The reaction collection module 140 collects information about whether the subject has recognized visual stimuli generated by the visual stimulus generation module 130. For example, information about whether the subject has reacted to preliminary stimuli may be collected through voice, a body movement such as a hand signal, etc., a mechanical response such as pressing a switch, and the like representing whether the subject has confirmed the presence of preliminary stimuli.

The reaction collection module 140 may detect the shape and position of the body of the subject, e.g., a hand, in the real space. The reaction collection module 140 may detect predetermined types of reactions of the subject to an input stimulus. The reaction collection module 140 may be an RGBD camera such as Microsoft's Kinect or ASUS Xtion-Pro. Alternatively, the reaction collection module 140 may be a well-known sensor capable of detecting a movement or change of the body. The appearance of a user's hand or the position, angle, etc. of the bones and joints of the user's hand may be identified by the reaction collection module 140.

The reaction collection module 140 may be an imaging device capable of obtaining a brain activity signal from the brain using functional near-infrared spectroscopy (fNIRS). When the subject's reaction is checked by directly measuring a signal from the brain, the reaction may be more identified more objectively and accurately, thus quantitatively identifying reaction information.

The reaction analysis module 150 may analyze reaction information based on information about whether there are reactions, which is collected by the reaction collection module 140, and provide the analyzed information to the virtual model generation module 110 or the visual stimulus generation module 130 as necessary.

The reaction analysis module 150 determines a cognitive range based on reaction information representing whether the subject has recognized preliminary stimuli collected by the reaction collection module 140. By continuously analyzing reaction information collected by the reaction collection module 140, changes in the determined cognitive range may be continuously tracked and reflected to adjust a virtual model and a position of a visual stimulus.

According to an embodiment, the visual stimulus generation module 130 may sequentially generate a plurality of first preliminary stimuli for identifying egocentric neglect within the field of vision of the subject based on the virtual object model.

The reaction collection module 140 may obtain and collect first reaction information indicating whether the subject has recognized the first preliminary stimuli.

The reaction analysis module 150 may determine an egocentric cognitive range in which the subject is able to egocentrically recognize visual stimuli based on the first reaction information.

The visual stimulus generation module 130 may sequentially generate a plurality of second preliminary stimuli for identifying allocentric neglect within an egocentric cognitive range based on the virtual object model.

The reaction collection module 140 may obtain and collect second reaction information indicating whether the subject has recognized the second preliminary stimuli.

The reaction analysis module 150 may determine an allocentric cognitive range in which the subject is able to allocentrically recognize visual stimuli based on the second reaction information.

A method of generating visual stimuli and providing a service for cognitive function rehabilitation by the device 100 using a virtual model in a virtual space as described above will be described in detail below.

Figure 2:
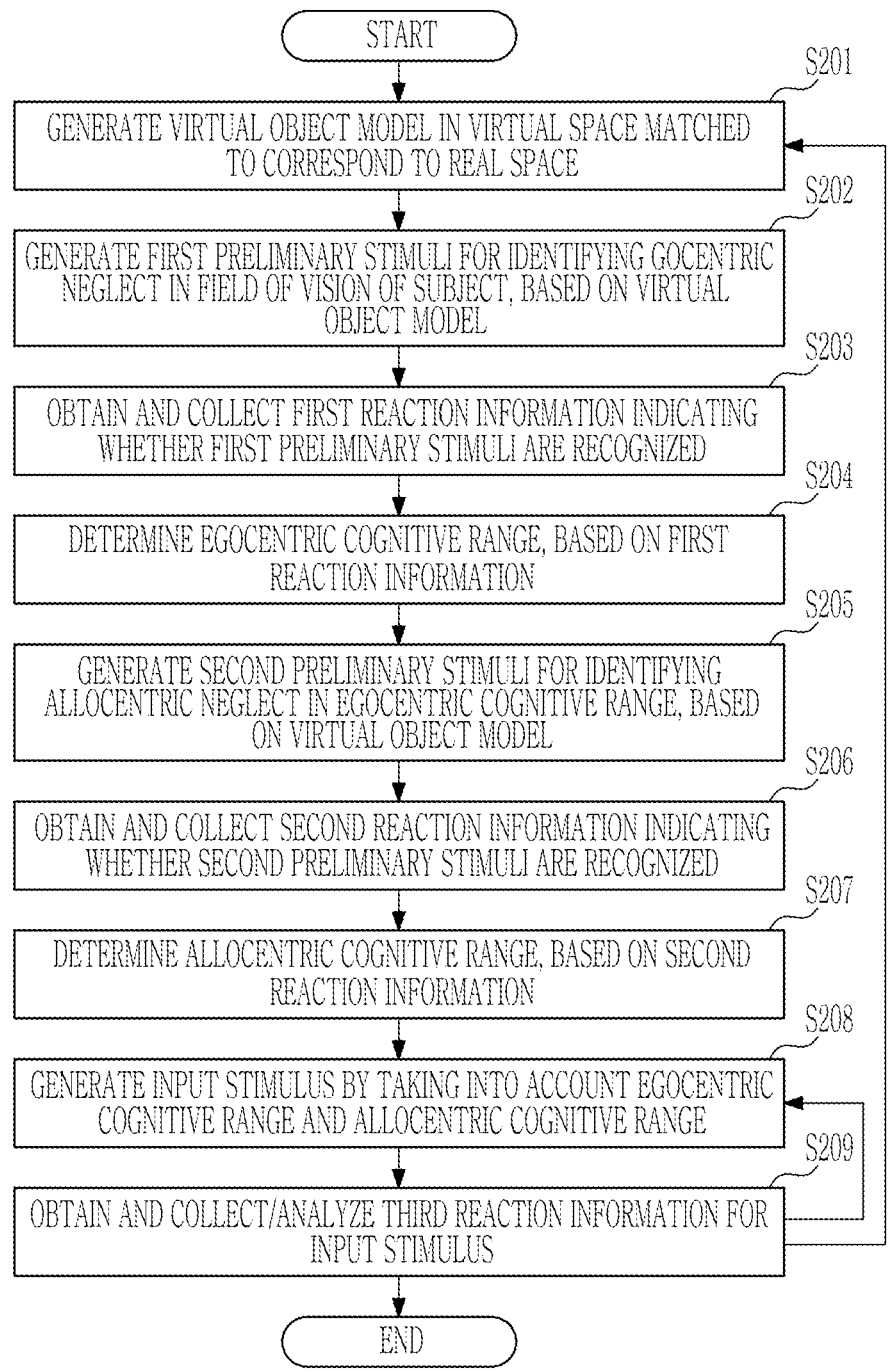
FIG. 2 is a flowchart of a process of providing a service for cognitive function rehabilitation using a virtual object model according to an embodiment.

FIG. 2 is a flowchart of a process of providing a service for rehabilitating a cognitive function using a virtual object model according to an embodiment.

Referring to FIG. 2, first, in operation S201, the device 100 may generate a virtual object model in a virtual space matched to correspond to a real space in which a subject is located.

Specifically, the device 100 matches a spatial relationship between a real space defined based on the position of the subject, and particularly, the positions of the subject's eyes, and a virtual space to be displayed through the visual stimulus generation module 130, so that the positions of the real space and the virtual space may correspond to each other.

By generating a virtual object model for visual stimulation in a virtual space matched to the real space, a position of a visual stimulus relative to the subject may be identified and a stimulus may be accurately generated at a required position to determine a cognitive range.

In operation S202, the device 100 may sequentially generate a plurality of first preliminary stimuli for identifying egocentric neglect in the field of vision of the subject.

According to an embodiment, the plurality of first preliminary stimuli are generated to be displayed in the field of vision of the subject to determine whether the subject suffers from egocentric neglect. The first preliminary stimuli may be sequentially generated at intervals of predetermined duration and pause time. The duration may be determined in consideration of the minimum time required for the subject to recognize a stimulus, and the pause time may be determined in consideration of the minimum time required for the subject to communicate whether he or she has recognized the stimulus. The first preliminary stimuli will be described in detail with reference to FIGS. 4 and 5 below.

Meanwhile, the field of vision of the subject may be calculated by taking into account an average viewing angle of a human and the distance between a fixed eye position of the subject and the visual stimulus generation module 130. The field of vision may be adjusted to match an actual field of vision of the subject according to repetitive stimulation and reaction.

In operation S203, the device 100 may obtain and collect first reaction information indicating whether the subject has recognized the first preliminary stimuli. Here, the first reaction information may include information indicating a reaction rate, accuracy, and shaking with respect to the first preliminary stimuli.

According to an embodiment, since it is sufficient to determine whether the subject has recognized the first preliminary stimuli, whether the subject has recognized the first preliminary stimuli may be determined quickly by a simple method such as voice, a hand signal, or the pressing of a button.

When whether the subject has recognized the first preliminary stimuli is determined, the device 100 may obtain and collect first reaction information related to a position of a visual stimulus recognized with respect to the first preliminary stimuli.

That is, when the plurality of first preliminary stimuli are generated in the field of vision of the subject, the first reaction information for the first preliminary stimuli may be obtained and collected by checking a reaction made by the subject as the subject recognizes the first preliminary stimuli and a non-reaction made by the subject as the subject fails to recognize the first preliminary stimuli.

In operation S204, the device 100 may determine an egocentric cognitive range in which the subject is able to egocentrically recognize visual stimuli based on the first reaction information.

According to an embodiment, when the subject recognizes all of the first preliminary stimuli displayed in the entire field of vision, it may be determined that the subject does not suffer from egocentric neglect, and in this case, an egocentric cognitive range may be determined to be the same as the field of vision of the subject.

When the subject fails to recognize first preliminary stimuli displayed on a first side (e.g., a left side) in the field of vision and recognizes only first preliminary stimuli displayed on a second side (e.g., a right side) in the field of vision, it may be determined that the subject suffers from egocentric neglect, and in this case, an egocentric cognitive range may be determined to be limited to a second side area in the field of vision of the subject.

In operation S205, the device 100 may sequentially generate a plurality of second preliminary stimuli for identifying allocentric neglect in the egocentric cognitive range based on the virtual object model.

According to an embodiment, the plurality of second preliminary stimuli are generated to be displayed in the egocentric cognitive range to determine whether the subject suffers from allocentric neglect. The second preliminary stimuli may be sequentially generated at intervals of predetermined duration and pause time. The duration may be determined in consideration of the minimum time required for the subject to recognize a stimulus, and the pause time may be determined in consideration of the minimum time required for the subject to communicate whether he or she has recognized the stimulus. The second preliminary stimuli will be described in detail with reference to FIGS. 6 and 7 below.

In operation S206, the device 100 may obtain and collect second reaction information indicating whether the subject has recognized the second preliminary stimuli. Here, the second reaction information may include information indicating a reaction rate, accuracy, and shaking with respect to the second preliminary stimuli.

According to an embodiment, since it is sufficient to determine whether the subject has recognized the second preliminary stimuli, whether the subject has recognized the second preliminary stimuli may be determined quickly by a simple method such as voice, a hand signal, or the pressing of a button.

When whether the subject has recognized the second preliminary stimuli is determined, the device 100 may obtain and collect second reaction information related to a position of a visual stimulus recognized with respect to the second preliminary stimuli.

That is, when the plurality of second preliminary stimuli are generated in the egocentric cognitive range of the subject, the second reaction information for the second preliminary stimuli may be obtained and collected by checking a reaction made by the subject as the subject recognizes the second preliminary stimuli and a non-reaction made by the subject as the subject fails to recognize the second preliminary stimuli.

In operation S207, the device 100 may determine an allocentric cognitive range in which the subject is able to allocentrically recognize visual stimuli based on the second reaction information.

According to an embodiment, when the subject recognizes all of the second preliminary stimuli displayed on first and second sides of an object located in the egocentric cognitive range, it may be determined that the subject does not suffer from allocentric neglect, and in this case, an allocentric cognitive range may be determined to be the same as the egocentric cognitive range.

When the subject fails to recognize the second preliminary stimuli displayed on the first side of the object located in the egocentric cognitive range and recognizes only the second preliminary stimulus displayed on the second side of the object, it may be determined that the subject suffers from allocentric neglect, and in this case, an allocentric cognitive range may be determined to be limited to a second side area of the object located in the egocentric cognitive range of the subject.

In operation S208, the device 100 may generate an input stimulus for the subject by taking into account the egocentric cognitive range and the allocentric cognitive range.

Specifically, when the subject suffers from egocentric neglect, the device 100 may generate a virtual object model at a position adjacent to a boundary of the egocentric cognitive range and display an input stimuli near the boundary of the egocentric cognitive range through the virtual object model.

In addition, when the subject suffers from allocentric neglect, the device 100 may generate a virtual object model at a position adjacent to a boundary of the allocentric cognitive range and display an input stimuli near the boundary of the allocentric cognitive range through the virtual object model.

According to an embodiment, an input stimulus generated in consideration of a cognitive range may be variously generated outside the cognitive range, at a boundary between the cognitive range and a non-cognitive range, or inside the cognitive range according to the purpose of visual stimulus generation.

In operation S209, the device 100 may obtain, collect and analyze third reaction information according to predetermined reactions of the subject to the input stimulus. Here, the third reaction information may include information indicating a reaction rate, accuracy, and shaking with respect to the input stimulus.

Specifically, the device 100 may collect third reaction information indicating whether a part of the body of the subject reaches a position in the real space corresponding to a position of the virtual object model in the virtual space which the input stimulus is based on.

By detecting the movement of the subject's body with respect to the input stimulus through an RGBD camera, a wearable sensing device or the like, it is possible to check whether a part of the body of the subject reaches the position of the input stimulus or an arbitrary position in the real space that is different from the position of the input stimulus corresponding to the position of the virtual object model in the virtual space.

Unlike the third reaction information described above, it is possible to collect third reaction information for simply checking whether the input stimulus is recognized similar to the first reaction information and the second reaction information. Alternatively, the first reaction information, the second reaction information, and the third reaction information may be divided and collected according to various types of actions made by the subject.

The device 100 may analyze the third reaction information through a learning curve. A phenomenon that a lot of time is required when a human first performs a task because he or she is not familiar with the task, but the time required to perform the task decreases as the task is repeatedly performed is called a learning effect, and the learning curve is a mathematical model that is a representation of the learning effect. That is, a rate of increase in the learning effect in responding to an input stimulus is low at an initial stage but may gradually increase through continuous repetition.

According to an embodiment, after operation S209, the process may return to operation S208, and the device 100 may determine the type, position, duration, frequency, etc. of the input stimulus according to the learning curve analyzed according to the third reaction information.

Specifically, the device 100 may set a cognitive training area adjacent to a boundary of an egocentric or allocentric cognitive range and determine a generation rate of an input stimulus to be displayed in the cognitive training area, based on the learning curve according to the third reaction information.

For example, when it is determined that the subject suffers from egocentric neglect, the device 100 may set an area adjacent to the boundary of the egocentric cognitive range to a cognitive training area, and determine the generation rate of the input stimulus to be higher than the reference value so that the input stimulus may be intensively displayed on the cognitive training area. Thereafter, when it is determined that the egocentric neglect that the subject suffers from has been cured to some degree, based on the learning curve according to the third reaction information for the input stimulus, the device 100 may determine the generation rate of the input stimulus to be lower than the reference value so that the input stimulus may not be intensively displayed in the cognitive training area.

When it is determined that the subject suffers from allocentric neglect, the device 100 may set an area adjacent to the boundary of the allocentric cognitive range to a cognitive training area, and determine the generation rate of the input stimulus to be higher than the reference value so that the input stimulus may be intensively displayed in the cognitive training area. Thereafter, when it is determined that the allocentric neglect that the subject suffers from has been cured to some degree, based on the learning curve according to the third reaction information for the input stimulus, the device 100 may determine the generation rate of the input stimulus to be lower than the reference value so that the input stimulus may not be intensively displayed in the cognitive training area.

The device 100 may generate an input stimulus again to be intensively displayed in the cognitive training area according to the generation rate of the input stimulus, and obtain and collect third reaction information again according to the subject's reaction to the input stimulus generated intensively in the cognitive training area.

After operation S209, the process may return to operation S201, and the device 100 may determine the position, movement, speed, path, etc. of the virtual object model according to the learning curve analyzed according to the third reaction information.

Figure 3A:
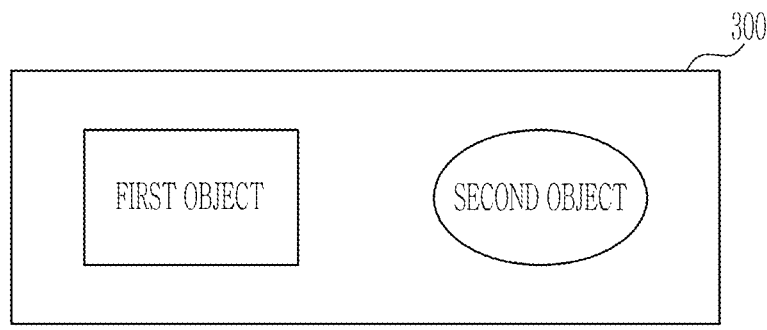
FIGS. 3A-3C are diagrams for describing a process of distinguishing between egocentric neglect and allocentric neglect according to an embodiment.
Figure 3B:
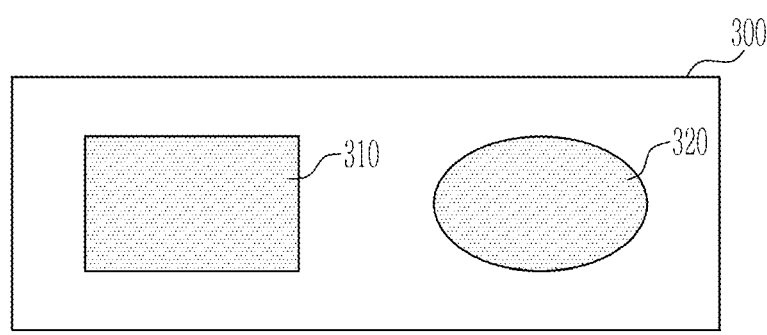
Figure 3C:
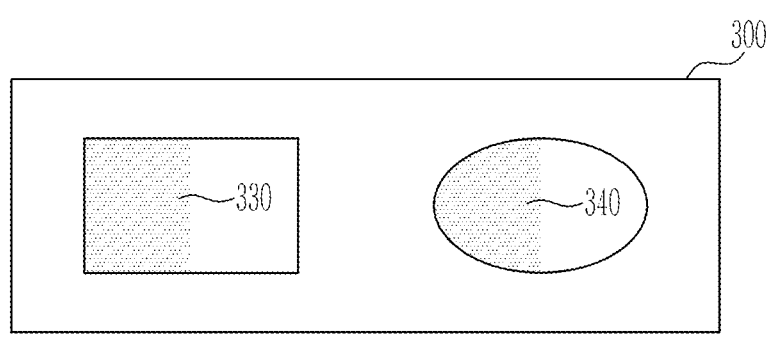

FIGS. 3A-3C are diagrams for describing a process of distinguishing between egocentric neglect and allocentric neglect according to an embodiment.

According to an embodiment, in order to generate a virtual object model, the device 100 may match a real space and a virtual space to correspond to each other such that a first object on a first side of the real space and a second object on a second side of the real space are located in the virtual space.

For example, when the first object and the second object are respectively located on a left side and a right side of the real space, the device 100 may set the first object and the second object to be respectively located on a left side and a right side of the virtual space 300 as shown in FIG. 3A.

The device 100 may determine that a subject suffers from egocentric neglect when it is confirmed that either a first preliminary stimulus displayed in an area of the first object or a first preliminary stimulus displayed in an area of the second object is not recognized by the subject in determining an egocentric cognitive range.

Specifically, as shown in FIG. 3B, the device 100 may determine that the subject does not suffer from egocentric neglect when it is confirmed that both a first preliminary stimulus displayed in an area 310 of the first object and a first preliminary stimulus displayed in an area 320 of the second object are recognized.

When it is confirmed that the first preliminary stimulus displayed in the area 310 of the first object is recognized, but the first preliminary stimulus displayed in the area 320 of the second object is not recognized, the device 100 may determine that the subject suffers from egocentric neglect in which a cognitive range is biased to the left in the field of vision.

Conversely, when it is confirmed that the first preliminary stimulus displayed in the area 310 of the first object is not recognized, but the first preliminary stimulus displayed in the area 320 of the second object is recognized, the device 100 may determine that the subject suffers from egocentric neglect in which a cognitive range is biased to the right in the field of vision.

The device 100 may determine that the subject suffers from allocentric neglect when it is confirmed that either a second preliminary stimulus displayed on a first side region of the area 310 of the first object or a second preliminary stimulus displayed on a second side region of the area 320 of the second object is not recognized by the subject in determining an allocentric cognitive range.

Specifically, as shown in FIG. 3C, the device 100 may determine that the subject does not suffer from allocentric neglect when it is confirmed that both a second preliminary stimulus displayed in a left region 330 of the area 310 of the first object and a second preliminary stimulus displayed in a right region 340 of the area 320 of the second object are recognized.

The device 100 may determine that the subject suffers from allocentric neglect having a cognitive range for only left visual stimuli among visual stimuli when it is confirmed that the second preliminary stimulus displayed in the left region 330 of the area 310 of the first object is recognized, but the second preliminary stimulus displayed in the right region 340 of the area 320 of the second object is not recognized.

Conversely, the device 100 may determine that the subject suffers from allocentric neglect having a cognitive range for only right visual stimuli among visual stimuli when it is confirmed that the second preliminary stimulus displayed in the left region 330 of the area 310 of the first object is not recognized, but the second preliminary stimulus displayed in the right region 340 of the area 320 of the second object is recognized.

Figure 4:
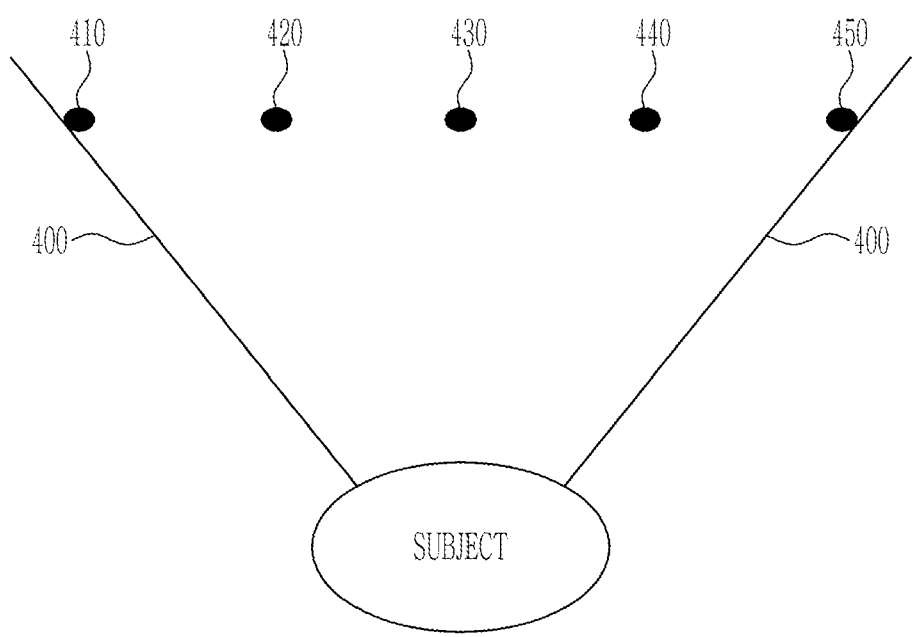
FIG. 4 is a diagram for describing a process of sequentially generating first preliminary stimuli according to an embodiment.

FIG. 4 is a diagram for describing a process of sequentially generating first preliminary stimuli according to an embodiment.

According to an embodiment, the device 100 may sequentially generate a plurality of first preliminary stimuli at a plurality of positions within a field of vision 400 of a subject based on a virtual object model. The plurality of first preliminary stimuli that are sequentially generated may be sequentially displayed in a virtual space, and the subject may recognize the first preliminary stimuli sequentially displayed through an HMD device displaying the virtual space.

Specifically, the device 100 may generate a 1-1 preliminary stimulus to be displayed at a first point 410 at an end of a first side of a field of vision 400 of the subject. That is, the 1-1 preliminary stimulus may be generated and displayed at the first point 410 at an end of a left side of the field of vision 400 that is recognizable by the subject. The device 100 may obtain reaction information for the 1-1 preliminary stimulus to check whether the subject has recognized the 1-1 preliminary stimulus.

Thereafter, the device 100 may generate a 1-2 preliminary stimulus to be displayed at a second point 420 at an end of a second side of the field of vision 400 of the subject. That is, the 1-2 preliminary stimulus may be generated and displayed at the second point 420 at an end of a right side of the field of vision 400 that is recognizable by the subject. The device 100 may obtain reaction information for the 1-2 preliminary stimulus to check whether the subject has recognized the 1-2 preliminary stimulus.

When a result of checking whether the 1-1 preliminary stimulus has been recognized and whether the 1-2 preliminary stimulus has been recognized reveals that the 1-2 preliminary stimulus has been recognized, but the 1-1 preliminary stimulus has not been recognized, the device 100 may generate a 1-3 preliminary stimulus to be displayed at a third point 430 that is a midpoint between the first point 410 and the second point 420. That is, because the subject suffers from egocentric neglect, the 1-3 preliminary stimulus may be generated and displayed at the third point 430 that is the midpoint between the first point 410 and the second point 420 to determine an egocentric cognitive range. The device 100 may obtain reaction information for the 1-3 preliminary stimulus to check whether the subject has recognized the 1-3 preliminary stimulus.

When a result of checking whether the 1-3 preliminary stimulus has been recognized reveals that the 1-3 preliminary stimulus has been recognized, the device 100 may generate a 1-4 preliminary stimulus to be displayed at a fourth point 440 that is a midpoint between the first point 410 and the third point 430. That is, because the subject has failed to recognize the 1-1 preliminary stimulus while recognizing only the 1-2 preliminary stimulus, and has additionally recognized the 1-3 preliminary stimulus, the 1-4 preliminary stimulus may be generated and displayed at the fourth point 440 that is the midpoint between the first point 410 and the third point 430 to increase the egocentric cognitive range. The device 100 may obtain reaction information for the 1-4 preliminary stimulus to check whether the subject has recognized the 1-4 preliminary stimulus.

When a result of checking whether the 1-3 preliminary stimulus has been recognized reveals that the 1-3 preliminary stimulus has not been recognized, the device 100 may generate a 1-5 preliminary stimulus to be displayed at a fifth point 450 that is a midpoint between the second point 420 and the third point 430. That is, because the subject has failed to recognize the 1-1 preliminary stimulus while recognizing only the 1-2 preliminary stimulus, and also has failed to recognize the 1-3 preliminary stimulus, the 1-5 preliminary stimulus may be generated and displayed at the fifth point 450 that is the midpoint between the second point 420 and the third point 430 to reduce the egocentric cognitive range. The device 100 may obtain reaction information for the 1-5 preliminary stimulus to check whether the subject has recognized the 1-5 preliminary stimulus.

According to an embodiment, the 1-1 preliminary stimulus, the 1-2 preliminary stimulus, the 1-3 preliminary stimulus, the 1-4 preliminary stimulus, and the 1-5 preliminary stimulus may be displayed in the same form and color in a virtual space, and may be different from one another only in terms of points where they are displayed.

Alternatively, the 1-1 preliminary stimulus, the 1-2 preliminary stimulus, the 1-3 preliminary stimulus, the 1-4 preliminary stimulus, and the 1-5 preliminary stimulus may be displayed in different forms and colors in the virtual space and thus be different from one another in terms of forms and points where they are displayed.

According to an embodiment, first preliminary stimuli may be displayed at more points to more accurately determine an egocentric cognitive range. For example, first preliminary stimuli may be additionally displayed, for example, between the first point 410 and the fourth point 440, between the fourth point 440 and the third point 430, between the third point 430 and the fifth point 450, and between the fifth point 450 and the second point 420.

Figure 5:
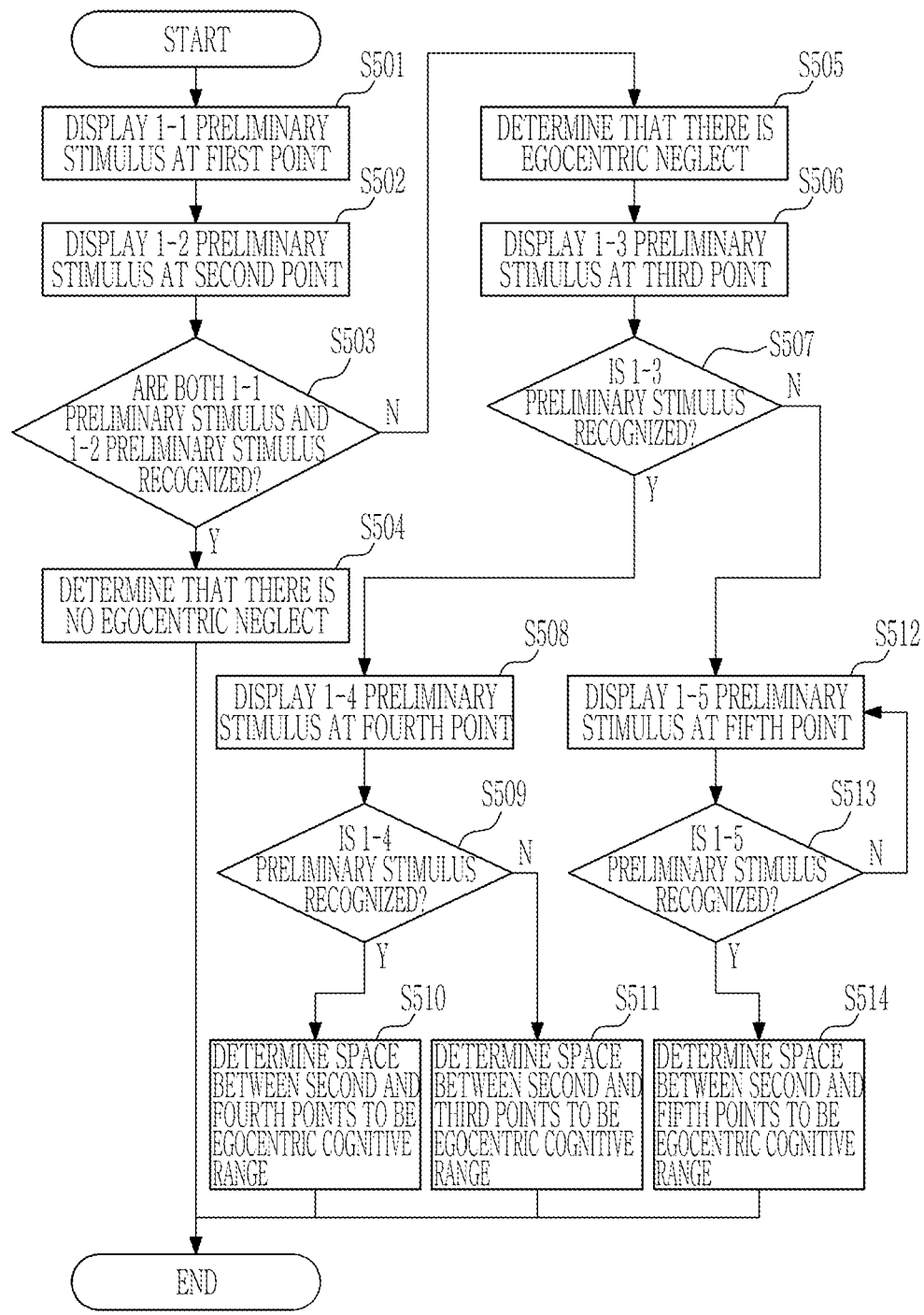
FIG. 5 is a flowchart of a process of determining an egocentric cognitive range according to whether first preliminary stimuli are recognized according to an embodiment.

FIG. 5 is a flowchart of a process of determining an egocentric cognitive range according to whether first preliminary stimuli are recognized according to an embodiment.

Referring to FIG. 5, first, in operation S501, the device 100 may control a 1-1 preliminary stimulus to be displayed at the first point 410 in a virtual space. In this case, the device 100 may obtain reaction information for the 1-1 preliminary stimulus.

In operation S502, the device 100 may control a 1-2 preliminary stimulus to be displayed at the second point 420 in the virtual space. In this case, the device 100 may obtain reaction information for the 1-2 preliminary stimulus.

In operation S503, the device 100 may check whether both the 1-1 preliminary stimulus and the 1-2 preliminary stimulus have been recognized.

In operation S504, when it is determined in operation S503 that both the 1-1 preliminary stimulus and the 1-2 preliminary stimulus have been recognized, the device 100 may determine that a subject does not suffer from egocentric neglect.

In operation S505, when it is determined in operation S503 that either the 1-1 preliminary stimulus or the 1-2 preliminary stimulus has not been recognized, the device 100 may determine that the subject suffers from egocentric neglect. In this case, because a number of patients who suffer from an egocentric neglect symptom have a cognitive range biased to the right while ignoring the left, it may be confirmed that the subject has failed to recognize the 1-1 preliminary stimulus displayed at a left side of the field of vision 400 and has recognized the 1-2 preliminary stimulus displayed at a right side of the field of vision 400.

In operation S506, the device 100 may control a 1-3 preliminary stimulus to be displayed at the third point 430 in the virtual space. In this case, the device 100 may obtain reaction information for the 1-3 preliminary stimulus.

In operation S507, the device 100 may check whether the 1-3 preliminary stimulus has been recognized.

In operation S508, when it is determined in operation S507 that the 1-3 preliminary stimulus has been recognized, the device 100 may control a 1-4 preliminary stimulus to be displayed at the fourth point 440 in the virtual space. In this case, the device 100 may obtain reaction information for the 1-4 preliminary stimulus.

In operation S509, the device 100 may check whether the 1-4 preliminary stimulus has been recognized.

In operation S510, when it is determined in operation S509 that the 1-4 preliminary stimulus has been recognized, the device 100 may determine a space between the second point 420 and the fourth point 440 as an egocentric cognitive range. That is, since the subject has failed to recognize the 1-1 preliminary stimulus displayed at the first point 410 but has recognized all of the 1-2 preliminary stimulus displayed at the second point 420, the 1-3 preliminary stimulus displayed at the third point 430, and the 1-4 preliminary stimulus displayed at the fourth point 440, a space between the second point 420 and the fourth point 440 may be determined as an egocentric cognitive range.

In operation S511, when it is determined in operation S509 that the 1-4 preliminary stimulus has not been recognized, the device 100 may determine a space between the second point 420 and the third point 430 as an egocentric cognitive range. That is, since the subject has failed to recognize the 1-1 preliminary stimulus displayed at the first point 410 and the 1-4 preliminary stimulus displayed at the fourth point 440 but has recognized the 1-2 preliminary stimulus displayed at the second point 420 and the 1-3 preliminary stimulus displayed at the third point 430, a space between the second point 420 and the third point 430 may be determined as an egocentric cognitive range.

In operation S512, when it is determined in operation S507 that the 1-3 preliminary stimulus has not been recognized, the device 100 may control a 1-5 preliminary stimulus to be displayed at the fifth point 450 in the virtual space. In this case, the device 100 may obtain reaction information for the 1-5 preliminary stimulus.

In operation S513, the device 100 may check whether the 1-5 preliminary stimulus has been recognized.

In operation S514, when it is determined in operation S513 that the 1-5 preliminary stimulus has been recognized, the device 100 may determine a space between the second point 420 and the fifth point 450 as an egocentric cognitive range. That is, since the subject has failed to recognize the 1-1 preliminary stimulus displayed at the first point 410 and the 1-3 preliminary stimulus displayed at the third point 430 but has recognized the 1-2 preliminary stimulus displayed at the second point 420 and the 1-5 preliminary stimulus displayed at the fifth point 450, a space between the second point 420 and the fifth point 450 may be determined as an egocentric cognitive range.

When it is determined in operation S513 that the 1-5 preliminary stimulus has not been recognized, the process may return to operation S512, and the device 100 may control a 1-5 preliminary stimulus to be displayed again at a midpoint between the second point 420 and the fifth point 450. That is, in a state in which only the 1-2 preliminary stimulus displayed at the second point 420 has been recognized, since an egocentric cognitive range cannot be determined when only one preliminary stimulus is recognized, the 1-5 preliminary stimulus may be controlled to be displayed again by changing the position of the 1-5 preliminary stimulus.

Figure 6:
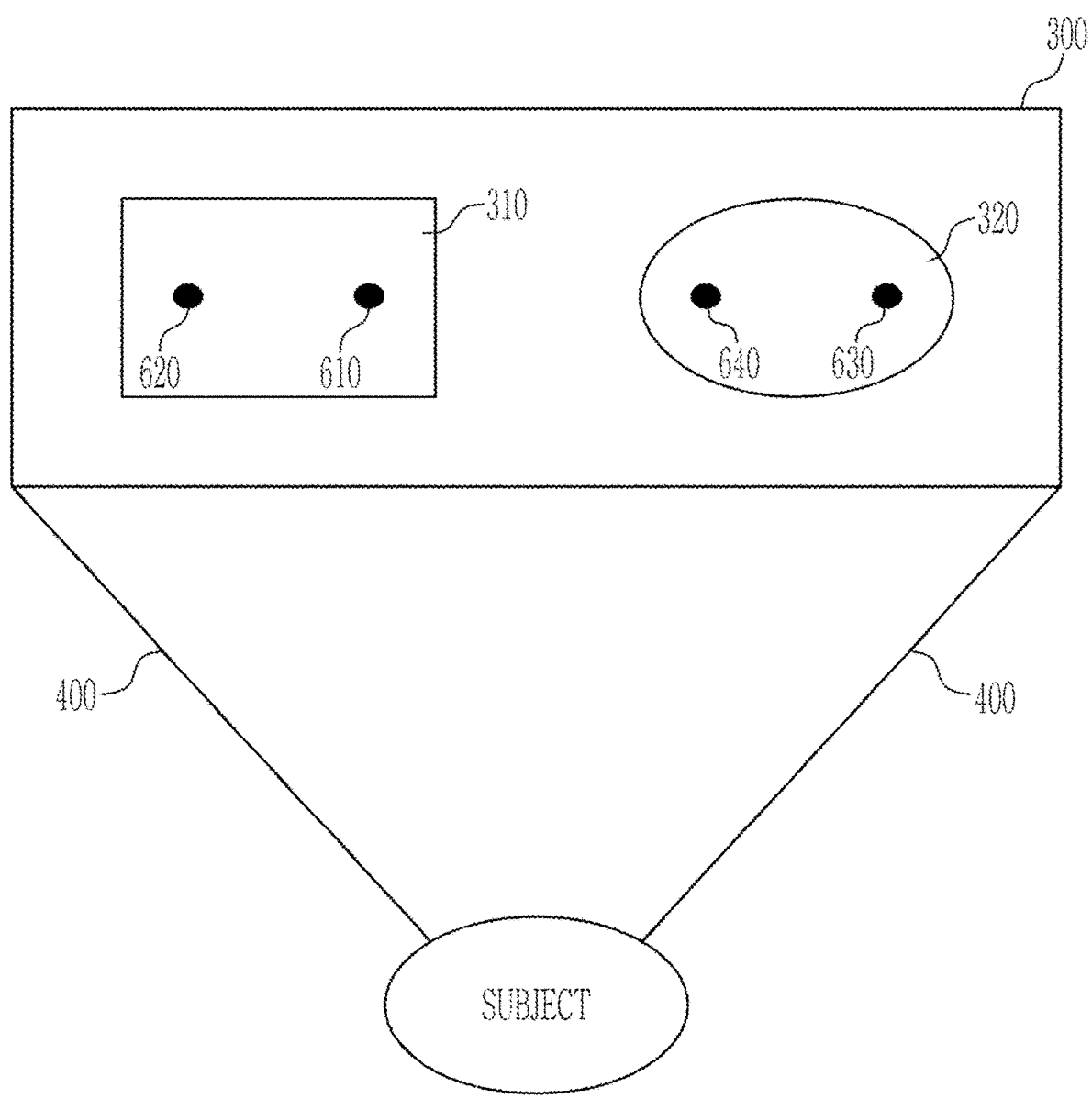
FIG. 6 is a diagram for describing a process of sequentially generating second preliminary stimuli according to an embodiment.

FIG. 6 is a diagram for describing a process of sequentially generating second preliminary stimuli according to an embodiment.

According to an embodiment, the device 100 may sequentially generate a plurality of second preliminary stimuli at a plurality of positions within a field of vision 400 of a subject based on a virtual object model. The plurality of second preliminary stimuli that are sequentially generated may be sequentially displayed in a virtual space 300, and the subject may recognize the second preliminary stimuli sequentially displayed through an HMD device displaying the virtual space 300.

According to an embodiment, a first object may be located and displayed on a left side of the virtual space 300, and a second object may be located and displayed on a right side of the virtual space 300. In this case, when an egocentric cognitive range is determined, the first object and the second object may be respectively located on the left and the right in the egocentric cognitive range.

The device 100 may generate a 2-1 preliminary stimulus to be displayed at a sixth point 610 on a right side of an area 310 of the first object when the field of vision 400 of the subject faces the virtual space 300 in which the first object and the second object are located. That is, the 2-1 preliminary stimulus may be generated and displayed at the sixth point 610 on the right side of the area 310 of the first object displayed on a left side of the virtual space. The device 100 may obtain reaction information for the 2-1 preliminary stimulus to check whether the subject has recognized the 2-1 preliminary stimulus.

When a result of checking whether the 2-1 preliminary stimulus has been recognized reveals that the 2-1 preliminary stimulus has been recognized, the device 100 may generate a 2-2 preliminary stimulus to be displayed at a seventh point 620 on a left side of the area 310 of the first object. That is, the 2-2 preliminary stimulus may be generated and displayed at the seventh point 620 on the left side of the area 310 of the first object displayed on the left side of the virtual space. The device 100 may obtain reaction information for the 2-2 preliminary stimulus to check whether the subject has recognized the 2-2 preliminary stimulus.

When a result of checking whether the 2-2 preliminary stimulus has been recognized reveals that the 2-2 preliminary stimulus has been recognized, the device 100 may generate a 2-3 preliminary stimulus to be displayed at an eighth point 630 on a right side of an area 320 of the second object. That is, the 2-3 preliminary stimulus may be generated and displayed at the eighth point 630 on the right side of the area 320 of the second object displayed on a right side of the virtual space. The device 100 may obtain reaction information for the 2-3 preliminary stimulus to check whether the subject has recognized the 2-3 preliminary stimulus.

When a result of checking whether the 2-2 preliminary stimulus has been recognized reveals that the 2-2 preliminary stimulus has not been recognized, the device 100 may generate a 2-4 preliminary stimulus to be displayed at a ninth point 640 on a left side of the area 320 of the second object. That is, the 2-4 preliminary stimulus may be generated and displayed at the ninth point 640 on the left side of the area 320 of the second object displayed on the right side of the virtual space. The device 100 may obtain reaction information for the 2-4 preliminary stimulus to check whether the subject has recognized the 2-4 preliminary stimulus.

Figure 7:
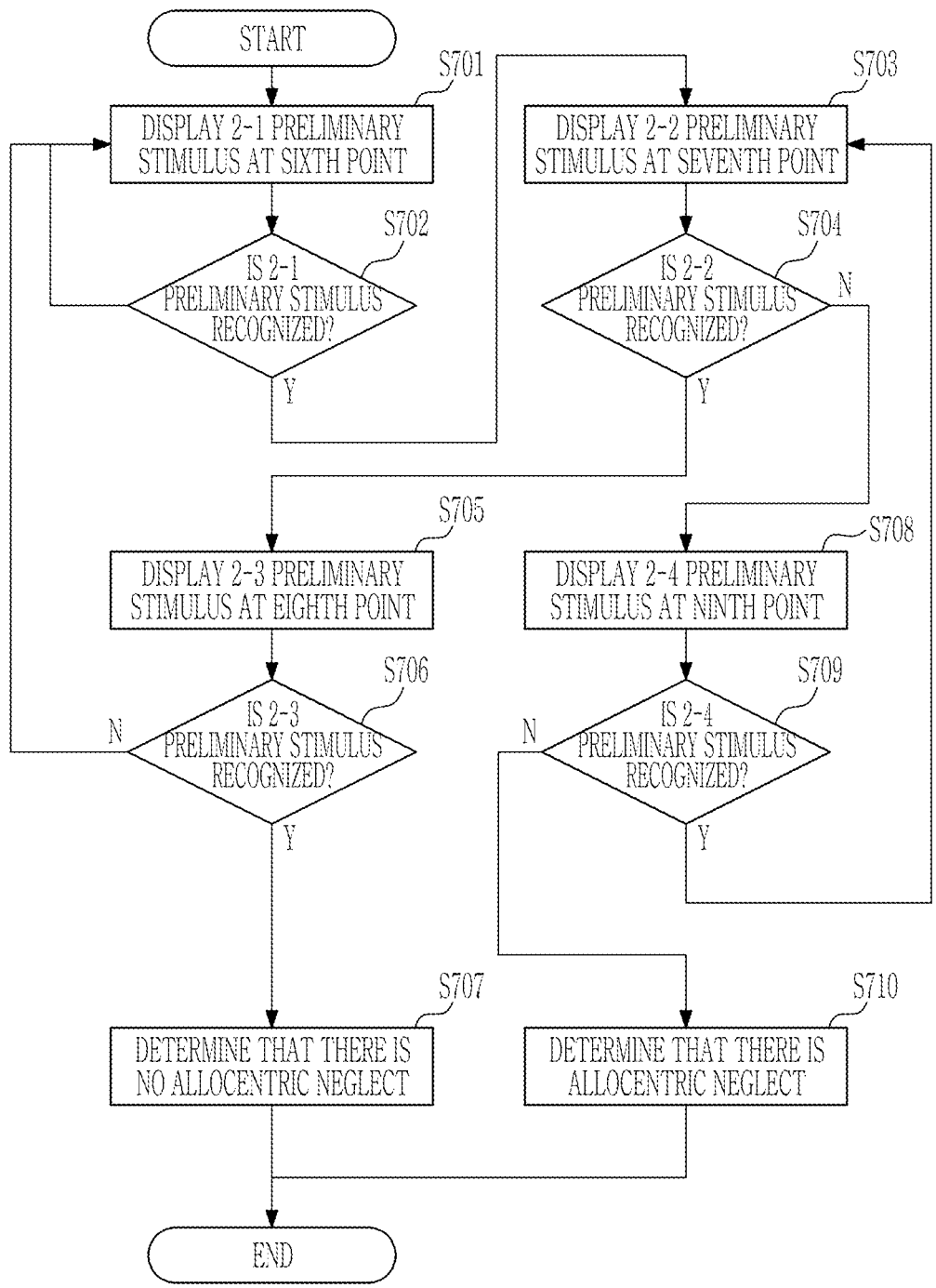
FIG. 7 is a flowchart of a process of determining whether there is allocentric neglect according to whether second preliminary stimuli are recognized according to an embodiment.

FIG. 7 is a flowchart of a process of determining whether there is allocentric neglect according to whether second preliminary stimuli are recognized according to an embodiment.

Referring to FIG. 7, first, in operation S701, the device 100 may control a 2-1 preliminary stimulus to be displayed at the sixth point 610 in the virtual space. In this case, the device 100 may obtain reaction information for the 2-1 preliminary stimulus.

In operation S702, the device 100 may check whether the 2-1 preliminary stimulus has been recognized.

In operation S703, when it is determined in operation S702 that the 2-1 preliminary stimulus has been recognized, the device 100 may control a 2-2 preliminary stimulus to be displayed at the seventh point 620 in the virtual space. In this case, the device 100 may obtain reaction information for the 2-2 preliminary stimulus.

When it is determined in operation S702 that the 2-2 preliminary stimulus has not been recognized, the process may return to operation S701, and the device 100 may change the position of the sixth point 610 and control the 2-1 preliminary stimulus to be displayed again at the changed sixth point 610.

In operation S704, the device 100 may check whether the 2-2 preliminary stimulus has been recognized.

In operation S705, when it is determined in operation S704 that the 2-2 preliminary stimulus has been recognized, the device 100 may control a 2-3 preliminary stimulus to be displayed at the eighth point 630 in the virtual space. In this case, the device 100 may obtain reaction information for the 2-3 preliminary stimulus.

In operation S706, the device 100 may check whether the 2-3 preliminary stimulus has been recognized.

In operation S707, when it is determined in operation S706 that the 2-3 preliminary stimulus has been recognized, the device 100 may determine that a subject does not suffer from allocentric neglect. That is, it may be determined that the subject does not suffer from allocentric neglect because the subject has recognized all of the 2-1 preliminary stimulus displayed at the sixth point 610, the 2-2 preliminary stimulus displayed at the seventh point 620, and the 2-3 preliminary stimulus displayed at the eighth point 630.

When it is determined in operation S706 that the 2-3 preliminary stimulus has not been recognized, the process may return to operation S701 and the device 100 may control the 2-1 preliminary stimulus to be displayed again. That is, since the subject has recognized the 2-1 preliminary stimulus displayed at the sixth point 610 and the 2-2 preliminary stimulus displayed at the seventh point 620 but has failed to recognize the 2-3 preliminary stimulus displayed at the eighth point 630, it may be determined that the subject has made a mistake during the recognition of these stimuli and the process may be performed again, starting from the recognition of the 2-1 preliminary stimulus.

In operation S708, when it is determined in operation S704 that the 2-2 preliminary stimulus has not been recognized, the device 100 may control a 2-4 preliminary stimulus to be displayed at the ninth point 640 in the virtual space. In this case, the device 100 may obtain reaction information for the 2-4 preliminary stimulus.

In operation S709, the device 100 may check whether the 2-4 preliminary stimulus has been recognized.

When it is determined in operation S709 that the 2-4 preliminary stimulus has been recognized, the process may return to operation S703 and the device 100 may control the 2-2 preliminary stimulus to be displayed again. That is, when the subject has recognized the 2-1 preliminary stimulus displayed at the sixth point 610 and has failed to recognize the 2-2 preliminary stimulus displayed at the seventh point 620 but has recognized the 2-4 preliminary stimulus displayed at the ninth point 640, it may be determined that the subject has made a mistake during the recognition of these stimuli and the process may be performed again, starting from the recognition of the 2-2 preliminary stimulus.

In operation S710, when it is determined in operation S709 that the 2-4 preliminary stimulus has not been recognized, the device 100 may determine that the subject suffers from allocentric neglect. That is, it may be determined that the subject suffers from allocentric neglect because the subject has recognized only the 2-1 preliminary stimulus displayed at the sixth point 610 and has failed to recognize the 2-2 preliminary stimulus displayed at the seventh point 620 and the 2-4 preliminary stimulus displayed at the ninth point 640.

Figure 8:
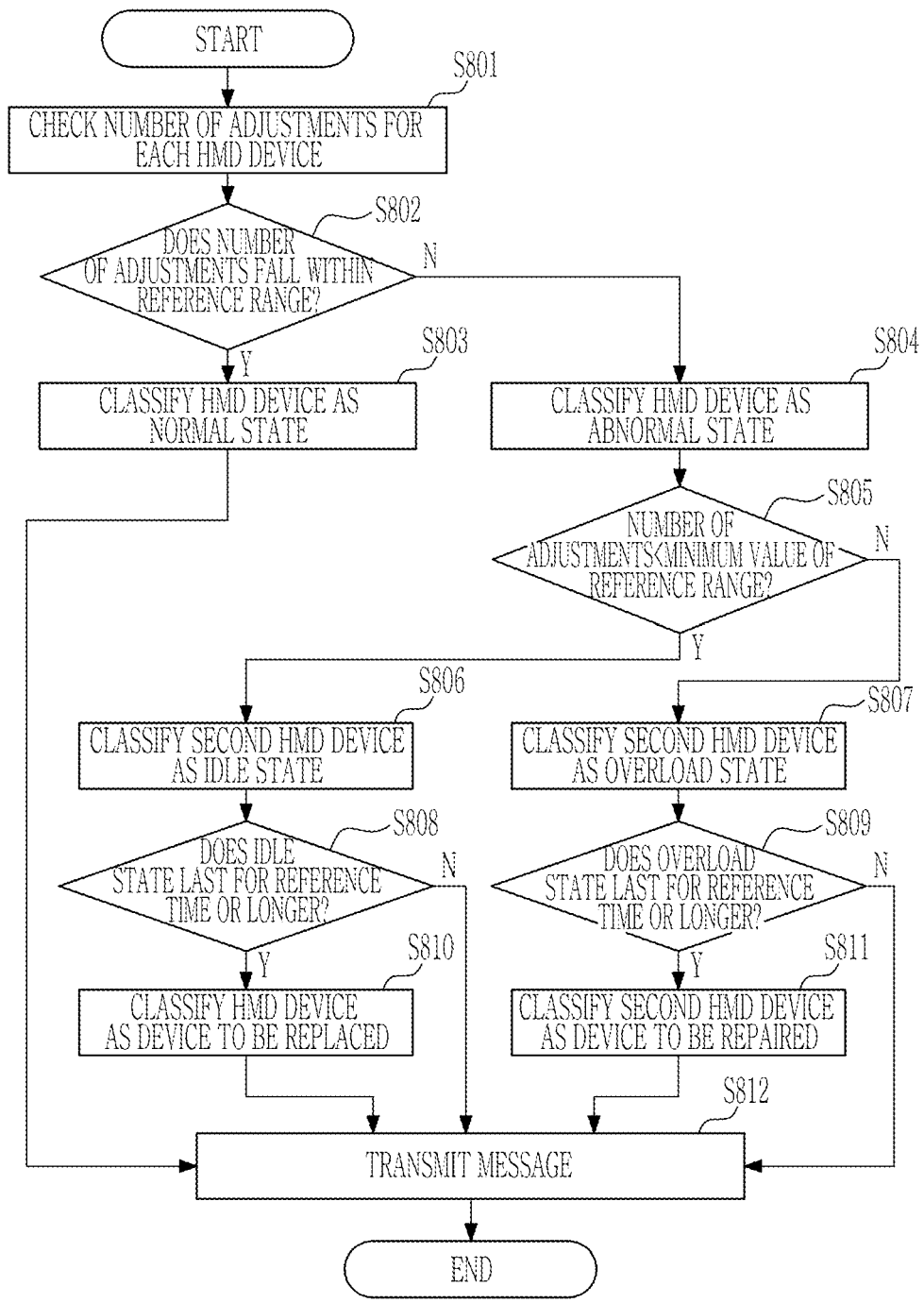
FIG. 8 is a flowchart of a process of classifying states of a head-mounted display (HMD) device according to an embodiment.

FIG. 8 is a flowchart of a process of classifying states of HMD devices according to an embodiment.

According to an embodiment, the system may include HMD devices, sensor groups, and thermo-hygrostats, as well as the device 100.

Specifically, the system may include plurality of HMD devices disposed in a rehabilitation training room to display and provide a virtual space. For example, when a first HMD device, a second HMD device, and a third HMD device are disposed in the rehabilitation training room, the system may further include a first sensor group and a first thermo-hygrostat that correspond to the first HMD device, a second sensor group and a second thermo-hygrostat that correspond to the second HMD device, and a third sensor group and a third thermo-hygrostat that correspond to the third HMD device.

Each of the HMD devices may include a sensor group for measuring the temperature and humidity of internal air. For example, the first HMD device may include a first sensor group that measures the temperature and humidity of air inside the first HMD device, and the second HMD device may include a second sensor group that measures the temperature and humidity of air inside the second HMD device.

Each of these sensor groups may include a temperature sensor for measuring temperature and a humidity sensor for measuring humidity.

One of the thermo-hygrostats may be connected to each of the HMD devices, and for example, the first thermo-hygrostat may be connected to the first HMD device, and the second thermo-hygrostat may be connected to the second HMD device.

The first thermo-hygrostat may heat or cool air to maintain a target temperature set in the first HMD device and humidify or dehumidify the air to maintain a target humidity set in the first HMD device.

Similarly, the second thermo-hygrostat may heat or cool air to maintain a target temperature set in the second HMD device, and humidify or dehumidify the air to maintain a target humidity set in the second HMD device.

According to an embodiment, the target temperature set in the first HMD device and the target temperature set in the second HMD device may be automatically set to be the same but may be set differently according to user settings.

In addition, the target humidity set in the first HMD device and the target humidity set in the second HMD device may be automatically set to be the same, or may be set differently according to user settings.

The device 100 may control the operations of first HMD device, the second HMD device, the first sensor group, the second sensor group, the first thermo-hygrostat, and the second thermo-hygrostat that are included in the system to be normally performed.

The device 100 may control the operations of the first and second thermo-hygrostats to adjust temperatures measured in the first and second HMD devices to a target temperature and adjust humidities measured in the first and second HMD devices to a target humidity. Here, the first sensor group may measure the temperature and humidity of the first HMD device, and the second sensor group may measure the temperature and humidity of the second HMD device.

According to an embodiment, the device 100 may check a temperature measured by the first sensor group, control the operation of the first thermo-hygrostat connected to the first HMD device to maintain a target temperature set in the first HMD device, check a humidity measured by the first sensor group, and control the operation of the first thermo-hygrostat to maintain a target humidity set in the first HMD device.

In addition, the device 100 may check a temperature measured by the second sensor group, control the operation of the second thermo-hygrostat connected to the second HMD device to maintain a target temperature set in the second HMD device, check a humidity measured by the second sensor group, and control the operation of the second thermo-hygrostat to maintain a target humidity set in the second HMD device.

According to an embodiment, the device 100 may calculate a first temperature difference which is a difference between a temperature measured by the first sensor group and a target temperature set in the first HMD device, and control the first thermo-hygrostat connected to the first HDM device to operate when it is determined that the first temperature difference is greater than a reference value.

For example, when it is confirmed that a temperature measured by the first sensor group is 30° C. and a target temperature set in the first HMD device is 25° C. the device 100 may calculate the first temperature difference to be 5° C., and when a reference value is set to 3° C. a temperature change is necessary and thus the first thermo-hygrostat may be controlled to operate.

In addition, the device 100 may calculate a second temperature difference which is a difference between a temperature measured by the second sensor group and a target temperature set in the second HMD device, and control the second thermo-hygrostat connected to the second HDM device to operate when it is determined that the second temperature difference is greater than a reference value.

According to an embodiment, the device 100 may check a target temperature and a target humidity set in each of the HMD devices in the rehabilitation training room.

The device 100 may control the operations of the thermo-hygrostats connected to the HMD devices to adjust temperatures measured in the HMD devices to a target temperature and adjust humidities measured in the HMD devices to a target humidity.

In operation S801, the device 100 may check the number of adjustments to maintain a target temperature and a target humidity for a predetermined duration set for each of the HMD devices.

For example, when a temperature change is required in the first HMD device, the device 100 may control the first thermo-hygrostat to operate to adjust the first HMD device so that a target temperature may be maintained, and calculate the number of adjustments for the first HMD device so that the target temperature may be maintained during a week.

In operation S802, the device 100 may check whether the number of adjustments falls within a reference range.

In operation S803, when it is determined in operation S802 that the number of adjustments is within the reference range, the device 100 may classify an HMD device, for which the number of adjustments is identified to be within the reference range, as a normal state.

For example, when the reference range is set to 10 or more and 20 or less, the device 100 may classify the first HMD device as the normal state when it is determined that the number of adjustments of the first HMD device is 15.

In operation S804, when it is determined in operation S802 that the number of adjustments is out of the reference range, the device 100 may classify an HMD device, for which the number of adjustments is identified to not be within the reference range, as an abnormal state.

For example, when the reference range is set to 10 or more and 20 or less, the device 100 may classify the second HMD device as the abnormal state when it is determined that the number of adjustments of the second HMD device is 5 or 25.

In operation S805, the device 100 may check whether the number of adjustments of the second HMD device classified as the abnormal state is less than a minimum value of the reference range.

In operation S806, when it is determined in operation S805 that the number of adjustments of the second HMD device is less than the minimum value of the reference range, the device 100 may classify the second HMD device from the abnormal state to an idle state.

For example, when the reference range is set to 10 or more and 20 or less, the device 100 may classify the second HMD device as the idle state when it is determined that the number of adjustments of the second HMD device is less than the minimum value, i.e., 10, of the reference range.

When it is determined in operation S805 that the number of adjustments of the second HMD device is not less than the minimum value of the reference range, since the number of adjustments of the second HMD device is out of the reference range, the device 100 may determine that the number of adjustments of the second HMD device is greater than a maximum value of the reference range. In operation S807, when it is determined that the number of adjustments of the second HMD device is greater than a maximum value of the reference range, the device 100 may classify the second HMD device from the abnormal state to an overload state.

For example, when the reference range is set to 10 or more and 20 or less, the device 100 may classify the second HMD device as the overload state when it is determined that the number of adjustments of the second HMD device is 25 and thus is greater than the maximum value, i.e., 20, of the reference range.

In operation S808, when the second HMD device is classified as the idle state, the device 100 may check whether the idle state of the second HMD device lasts for a reference time or longer. Here, the reference time may be set differently according to an embodiment.

In operation S810, when it is determined in operation S808 that the idle state of the second HMD device lasts for the reference time or longer, the device 100 may classify the second HMD device as a device to be replaced.

For example, when it is determined that the idle state of the second HMD device lasts for one month or more, the device 100 may classify the second HMD device as a device to be replaced.

In operation S809, when the second HMD device is classified as the overload state, the device 100 may check whether the overload state of the second HMD device lasts for the reference time or longer.

In operation S811, when it is determined in operation S809 that the overload state of the second HMD device lasts for the reference time or longer, the device 100 may classify the second HMD device as a device to be repaired.

For example, when it is determined that the overload state of the second HMD device lasts for one month or more, the device 100 may classify the second HMD device as a device to be repaired.

In operation S812, the device 100 may perform control so that a message notifying states of the first HMD device and the second HMD device is transmitted to a manager terminal.

In operation S803, when the first HMD device is classified as the normal state, the device 100 may perform control so that a message notifying that the state of the first HMD device is normal is transmitted to the manager terminal.

In operation S804, when the second HMD device is classified as the abnormal state, the device 100 may perform control so that a message notifying that the state of the second HMD device is abnormal is transmitted to the manager terminal.

When the second HMD device is classified as the idle state in operation S806 and the idle state does not last for the reference time in operation S808, the device 100 may perform control so that a message notifying that the state of the second HMD device changes from the abnormal state to the idle state is transmitted to the manager terminal.

When the second HMD device is classified as the overload state in operation S807 and the overload state does not last for the reference time in operation S809, the device 100 may perform control so that a message notifying that the state of the second HMD device changes from the abnormal state to the overload state is transmitted to the manager terminal.

In operation S810, when the second HMD device is classified as a device whose position is to be changed, the device 100 may control a message, which notifies that the idle state of the second HMD device lasts for a long time and thus the position of the second HMD device should be changed, to be transmitted to the manager terminal.

In operation S811, when the second HMD device is classified as a device to be repaired, the device 100 may control a message, which notifies that the overload state of the second HMD device lasts for a long time and thus the second HMD device needs to be repaired, to be transmitted to the manager terminal.

Figure 9:
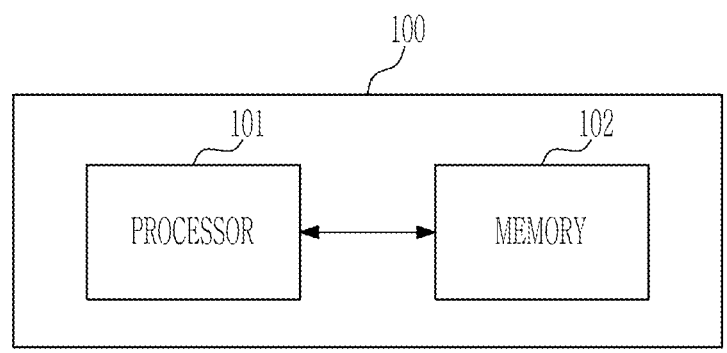
FIG. 9 is a diagram illustrating an example of a configuration of a device according to an embodiment.

FIG. 9 is a diagram illustrating an example of a configuration of a device according to an embodiment.

In an embodiment, a device 100 includes a processor 101 and a memory 102. The processor 101 may include at least one of the devices described above with reference to FIGS. 1 to 8 or perform at least one of the methods described above with reference to FIGS. 1 to 8. A person or organization using the device 100 may provide a service related to some or all of the methods described above with reference to FIGS. 1 to 8.

The memory 102 may store information related to the above-described methods or store a program for performing the above-described methods. The memory 102 may be a volatile memory or a non-volatile memory.

The processor 101 may execute a program and control the device 100. Code of the program executed by the processor 101 may be stored in the memory 102. The device 100 may be connected to an external device (e.g., a personal computer or a network) through an input/output device (not shown), and may exchange data through wired/wireless communication.

The embodiments described above may be implemented with hardware components, software components, and/or a combination thereof. For example, the devices, the methods and components described in the embodiments may be implemented using one or more general-purpose computers or special-purpose computers, e.g., a processor, a controller, an arithmetic logic unit (ALU), a digital signal processor, a microcomputer, a field-programmable gate array (FPGA), a programmable logic unit (PLU), a microprocessor, or any other devices capable of executing and responding to instructions. A processing device may execute an operating system (OS) and one or more software applications run on the OS. The processing device may access, store, manipulate, process, and generate data in response to the execution of software. For the sake of understanding, although it may be described herein that one processing device is used, it will be apparent to those of ordinary skill in the art that the processing device may include multiple processing elements and/or multiple types of processing elements. For example, the processing device may include a plurality of processors or one processor and one controller. In addition, another processing configuration such as a parallel processor may be applicable.

Methods according to embodiments may be embodied as program instructions executable through various computer means and recorded on a computer-readable recording medium. The computer-readable recording medium may store program instructions, data files, data structures, and the like solely or in combination. The program instructions recorded on the medium may be specially designed and configured for embodiments or may be known to those skilled in computer software. Examples of the computer-readable recording medium include a magnetic medium, e.g., a hard disk, a floppy disk, or a magnetic tape, an optical medium, e.g., a CD-ROM or a DVD, a magneto-optical medium, e.g., a floptical disk, and a hardware device. e.g., a ROM, a RAM, or a flash memory, which is specially configured to store and execute program instructions. Examples of the program instructions include not only machine language code created by a compiler but also high-level language code executable by a computer using an interpreter or the like. The hardware device described above may be configured to operate as one or more software modules to perform operations of an embodiment and vice versa.

The software components may include a computer program, code, instructions, or a combination of one or more thereof, and cause a processing device to operate as desired or send instructions independently or collectively to the processing device. The software and/or the data may be embodied permanently or temporarily as a type of machine, a component, a physical device, virtual equipment, a computer storage medium or device, or signal wave to be transmitted to be interpreted by a processing device or to provide a command or data to the processing device. The software may be distributed on computer systems connected through a network, and stored or executed in a distributed manner. The software and data may be stored in one or more computer-readable recording media.

Although the embodiments have been described above in conjunction with a limited number of the drawings, various modifications and changes may be made by those of ordinary skill in the art on the basis of the embodiments. For example, an appropriate result may be achieved even when the above-described techniques are performed in an order different from that described herein and/or the above-described components such as a system, a structure, a device, and a circuit, are combined in a form different from that described herein or replaced with other components.

Therefore, other implementations, other embodiments, and equivalents to the claims are also within the scope of the claims described below.

The invention claimed is:

1. A method of providing, by a device, a service for cognitive function rehabilitation using a virtual object model, the method comprising:
generating the virtual object model in a virtual space matched to a real space in which a subject is located;
sequentially generating a plurality of first preliminary stimuli for identifying egocentric neglect in a field of vision of the subject, based on the virtual object model;
obtaining and collecting first reaction information indicating whether the first preliminary stimuli are recognized by the subject;
determining an egocentric cognitive range in which the subject is able to egocentrically recognize a visual stimulus, which is different from the plurality of first preliminary stimuli, based on the first reaction information;
sequentially generating a plurality of second preliminary stimuli for identifying allocentric neglect in an egocentric cognitive range, based on the virtual object model;
obtaining and collecting second reaction information indicating whether the second preliminary stimuli are recognized by the subject; and
determining an allocentric cognitive range in which the subject is able to allocentrically recognize the visual stimulus, which is different from the plurality of second preliminary stimuli, based on the second reaction information.

2. The method of claim 1, further comprising:
generating an input stimulus for the subject by taking into account the egocentric cognitive range and the allocentric cognitive range; and
obtaining and collecting third reaction information according to a predetermined reaction of the subject to the input stimulus.

3. The method of claim 2, further comprising:
setting a cognitive training area adjacent to a boundary of the egocentric cognitive range or a boundary of the allocentric cognitive range and determining a generation rate of the input stimulus to be displayed in the cognitive training area, based on a learning curve according to the third reaction information; and
obtaining and collecting the third reaction information again according to the subject's reaction to the input stimulus generated intensively in the cognitive training area, based on the generation rate, and
wherein the first reaction information comprises information indicating a reaction rate, accuracy, and shaking with respect to the first preliminary stimuli,
the second reaction information comprises information indicating a reaction rate, accuracy, and shaking with respect to the second preliminary stimuli, and
the third reaction information comprises information indicating a reaction rate, accuracy, and shaking with respect to the input stimulus.

4. The method of claim 1, wherein the generating of the virtual object model comprises matching the real space and the virtual space to correspond to each other so as to locate a first object and a second object in the virtual space, the first and second objects being respectively located on a first side and a second side of the real space,
the determining of the egocentric cognitive range comprises determining that there is egocentric neglect when it is determined that either a first preliminary stimulus displayed in an area of the first object or a first preliminary stimulus displayed in an area of the second object is not recognized, and
the determining of the allocentric cognitive range comprises determining that there is allocentric neglect when it is determined that either a second preliminary stimulus displayed on a first side region of the area of the first object or a second preliminary stimulus displayed on a second side region of the area of the second object is not recognized.

5. The method of claim 1, wherein the sequentially generating of the plurality of first preliminary stimuli comprises:
generating a 1-1 preliminary stimulus to be displayed at a first point at an end of a first side of the field of vision of the subject;
generating a 1-2 preliminary stimulus to be displayed at a second point at an end of a second side of the field of vision of the subject;
generating a 1-3 preliminary stimulus to be displayed at a third point, which is a midpoint between the first and second points, when the 1-1 preliminary stimulus among the 1-1 preliminary stimulus and the 1-2 preliminary stimulus is not recognized;
generating a 1-4 preliminary stimulus to be displayed at a fourth point, which is a midpoint between the first and third points, when the 1-3 preliminary stimulus is recognized; and generating a 1-5 preliminary stimulus to be displayed at a fifth point, which is a midpoint between the second and third points, when the 1-3 preliminary stimulus is not recognized, and the determining of the egocentric cognitive range comprises:

determining a space between the second and fourth points to be the egocentric cognitive range when it is determined that the 1-4 preliminary stimulus is recognized;

determining a space between the second and third points to be the egocentric cognitive range when it is determined that the 1-4 preliminary stimulus is not recognized; and determining a space between the second and fifth points to be the egocentric cognitive range when it is determined that the 1-5 preliminary stimulus is recognized.

6. A device for providing a service for cognitive function rehabilitation using a virtual object model, the device comprising:

a virtual model generation module configured to generate the virtual object model in a virtual space;

a virtual space matching module configured to match a real space in which a subject is located and the virtual space to correspond to each other;

a visual stimulus generation module configured to sequentially generate a plurality of first preliminary stimuli for identifying egocentric neglect in a field of vision of the subject based on the virtual object model;

a reaction collection module configured to obtain and collect first reaction information indicating whether the first preliminary stimuli are recognized by the subject; and a reaction analysis module configured to determine an egocentric cognitive range in which the subject is able to egocentrically recognize a visual stimulus, which is different from the plurality of first preliminary stimuli, based on the first reaction information, wherein the visual stimulus generation module sequentially generates a plurality of second preliminary stimuli for identifying allocentric neglect in the egocentric cognitive range, based on the virtual object model, the reaction collection module obtains and collects second reaction information indicating whether the second preliminary stimuli are recognized by the subject, and the reaction analysis module determines an allocentric cognitive range in which the subject is able to allocentrically recognize the visual stimulus, which is different from the plurality of second preliminary stimuli, based on the second reaction information.

* * * * *